Dec. 6, 1932.　　　D. M. McBEAN　　　1,890,063
TESTING APPARATUS AND METHOD
Filed Nov. 7, 1930
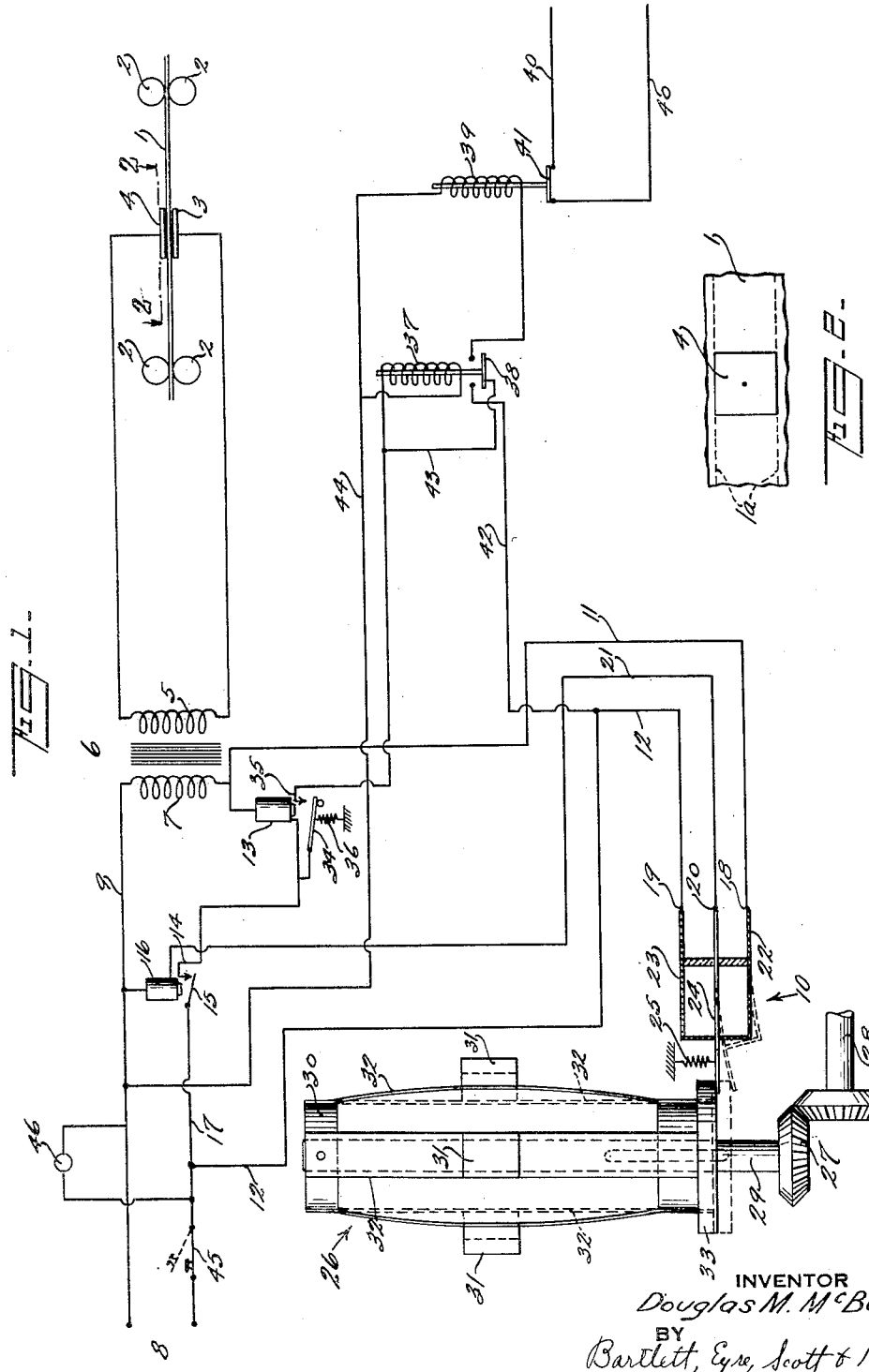
INVENTOR
*Douglas M. McBean.*
BY
*Bartlett, Eyre, Scott & Keel*
ATTORNEY Patented Dec. 6, 1932

1,890,063

UNITED STATES PATENT OFFICE

DOUGLAS M. McBEAN, OF CANAJOHARIE, NEW YORK, ASSIGNOR TO BEECH-NUT PACKING COMPANY, OF CANAJOHARIE, NEW YORK, A CORPORATION OF NEW YORK

TESTING APPARATUS AND METHOD

Application filed November 7, 1930. Serial No. 494,076.

The present invention relates to a method of detecting the presence of metallic or other electrically conducting materials in articles such as chewing gum and certain other materials, and to apparatus adapted for carrying out the method.

In spite of every precaution, in the manufacture of chewing gum, small pieces of solder or other metal are liable to become embedded in the gum and are not readily detectable by any method heretofore known. It is, of course, extremely important that the gum shall be entirely free of such impurities, and that preferably the presence thereof should be determined prior to the final wrapping of the gum.

If a sufficiently high difference in potential is applied across a dielectric, after a time there will be a flow of current thereacross, indicating a breakdown of the dielectric. If the dielectric contains impurities in the form of conducting particles, the breakdown will occur more rapidly than in the case of a pure dielectric, as the effective thickness of the delectric is reduced in proportion to the amount of foreign matter therein.

In accordance with my improved method as preferably carried out, a potential difference is impressed across a pair of electrodes between which the material to be tested is passed at a rate sufficient to prevent breakdown thereof except when impurities are present, the flow of current occasioned by the presence of conducting impurities being used to indicate the presence thereof as by stopping the machine producing the material.

In the preferred form of apparatus for carrying out the method, the potential difference applied across the article to be tested is that of the secondary of a transformer, and change in current in the primary of the transformer occasioned by the increased secondary current when conducting impurities are present is utilized to open the circuits of the machine producing the article, and of the transformer. Preferably also, a centrifugal switch is employed to close the circuit of the transformer only when the production machine is operating at a predetermined rate.

For a better understanding of the invention and of the advantages pertaining thereto, reference may be had to the accompanying drawing in which:

Figure 1 illustrates diagrammatically the preferred embodiment of the invention as applied to the detection of impurities in chewing gum; and Fig. 2 is a view taken on the line 2—2 of Fig. 1.

In Fig. 1 only so much of the machine for manufacturing chewing gum is indicated as is necessary for the understanding of the invention. The production machine may be of the type illustrated in the patent to Theodore Bauer, No. 1,700,303, Jan. 29, 1929, or may be any other known device adapted to produce chewing gum in the form of a continuous ribbon.

According to the present invention, the gum 1 as it is produced and prior to the trimming thereof, is passed between pairs of rollers 2 and between two electrodes 3 and 4 connected across the secondary 5 of a transformer 6.

After testing, the gum 1 is trimmed to a width indicated by the dotted lines 1a in Fig. 2. Preferably the width of each electrode 3 and 4 is made equal to that of the gum when trimmed. This arrangement avoids discharge about the edges of the gum during test, while insuring that the entire surface of the finished product has been subjected to test.

The primary 7 of the transformer is supplied with current from a suitable source of electromotive force, indicated diagrammatically in Fig. 1 by the terminals 8. One terminal of the primary 7 of the transformer 6 is connected to one terminal of the source 8 by means of a wire 9. The other terminals of the primary 7 and source 8 are adapted to be connected through either of two circuits, depending upon the position of a switch 10 hereinafter to be described. One of these circuits connecting the primary 7 and source 8, comprises the switch 10 and wires 11 and 12. The other of these circuits comprises the coils of a relay 13, upper contact 14 and armature 15 of a relay 16, and a wire 17 connected to the source 8.

The switch 10 includes two outer terminals 18 and 19, to which are respectively connected the wires 11 and 12, and an intermediate terminal 20 connected by means of a wire 21 and the relay 16 with the wire 9. Leaf spring contacts 22 and 23 are connected respectively with the terminals 18 and 19, and a switch lever 24 biased by a spring 25 toward engagement with contact 23, is connected to terminal 20.

When the lever 24 is depressed into the position indicated in dotted lines in Fig. 1, at which position contact 23 is disengaged, no current flows through the primary 7 of the transformer 6 as the circuit including wires 11 and 12 is broken at the switch 10, and the alternative circuit including relay 13 is broken at contact 14, due to opening of the circuit of relay 16 at the switch 10. When lever 24 is in the central position, shown in full lines, and therefore in engagement with both contacts 22 and 23, relay 16 and the primary 7 of the transformer are energized. In this position the circuit is closed through relay 13 but this relay will not be energized as it is shunted at the switch 10 through the circuit including wires 11 and 12. When spring 25 is permitted to raise lever 24 out of engagement with contact 22, the shunt-circuit across relay 13 is broken and this relay becomes energized.

The position of lever 24 which thus controls the energization of relays 13 and 16 and of the transformer is in turn controlled by a centrifugal device indicated generally by the reference numeral 26. The device 26, which is geared at 27 to a shaft 28 suitably driven by the machine producing the gum to be tested, comprises the vertical shaft 29 carrying a collar 30 supporting weights 31 by means of flexible steel strips 32. A collar 33, free to move vertically on the shaft 29 and keyed thereto to prevent torsional stresses in the springs 32, is fastened to the lower ends of the springs. The position of the collar 33, under the influence of the weights 31, controls the position of switch lever 24. When the production machine is not in operation or is running at very reduced speed, as for example, when being just started, collar 33 is in the lowermost position and engages and depresses lever 24 to disengage contact 23. As the machine picks up speed, the weights 31 fly out under the influence of the centrifugal force, and collar 33 is raised sufficiently to permit spring 25 to raise lever 24 to the central position shown where it engages both contacts 22 and 23. As the machine reaches full speed, collar 33 is raised sufficiently to release lever 24, whereupon spring 25 raises the lever out of engagement with contact 22.

When the machine is operating at full speed, with consequent energization of relays 13 and 16 and of the transformer owing to engagement of lever 24 with contact 23 and release of contact 22, as above explained, the apparatus is in condition to test the gum 1. If the gum 1 contains no conducting impurities, small current will flow in the secondary 5 of the transformer and consequently the primary current, flowing through the primary coil 7 and the relay 13 in series therewith, will be relatively small. Under these conditions an armature 34 of relay 13 is maintained out of engagement with its contact 35 by means of a spring 36. When impurities are present in the gum 1, current passes between the two electrodes 3 and 4, increasing the load upon the secondary of the transformer and correspondingly increasing the primary current sufficiently to cause relay 13 to lift armature 34 against the tension of spring 36 and to thereby close the circuit of a relay 37 connected between wire 9 and contact 35. Energization of relay 37 as a result of the presence of impurities in the gum 1 may be utilized in any desired manner for indicating the result of the test. In the embodiment illustrated, energization of relay 37 raises its armature 38 to close a circuit from the source 8 through a solenoid 39, which, upon being thus energized, opens the circuit 40 of the production machine by raising armature 41.

Energization of relay 37 due to the presence of impurities in gum 1, closes a stick circuit for this relay to maintain the same energized after stoppage of the production machine and consequent deenergization of relay 13 by the breakage of its circuit at switch 10. The stick circuit for relay 37 comprises the wires 12 and 42, armature 38, wire 43, windings of relay 37, and wire 44 connected to the wire 9 leading to the other terminal of the source 8. With this arrangement, the circuit 40 of the production machine will be maintained open until a switch 45 controlling all of the testing circuits is manually opened to deenergize relay 37 and solenoid 39. Opening of switch 45 extinguishes a signal light 46; indicating that the circuits are not in condiion for test.

It will be apparent that by relatively varying the voltage and the speed of travel of the material between the electrodes and by adjusting the electrodes toward and from each other, the apparatus may be accommodated for testing strips or sheets of material of different thicknesses or of different dielectric strength. Also, while the method and apparatus is particularly adapted for use in detecting the presence of impurities in chewing gum, certain features of the invention are adapted for use in testing other dielectric materials, such as rubber and felt, either for the purpose of detecting the presence of metallic substances or any points of dielectric weakness in the material. It will also be apparent that my invention permits various modifications without departing from the spirit thereof or the scope of the appended claims.

What I claim is:

1. The method of testing dielectric material which comprises maintaining the material for a predetermined length of time between electrodes, and impressing a potential difference across the electrodes of a value sufficient in that length of time to cause breakdown of the material at a point where the dielectric strength drops below a predetermined degree but not sufficient to otherwise cause breakdown of the material in that length of time.

2. The method of detecting metallic substances in a strip of chewing gum or similar material which comprises feeding the strip at a uniform rate longitudinally between two electrodes so as to maintain each portion of the strip between the electrodes for a predetermined period of time, and impressing a potential difference across the electrodes of such value relative to the time each portion of the strip is between the electrodes as to cause breakdown of the material only at the point where the metallic substance is located.

3. The method of detecting metallic substances in chewing gum which comprises maintaining for a predetermined length of time an untrimmed strip of the gum between two electrodes positioned closely adjacent the sides of the strip and of a width corresponding to the width of the gum when trimmed, and impressing a potential difference across the electrodes of such value as to cause during that length of time breakdown of the strip only at the point where the metallic substance occurs.

4. Apparatus for testing material in strip form having, in combination, means for feeding the strip longitudinally at a uniform rate, electrodes between which the material passes, said electrodes having a substantial length in the direction of travel of the strip, and means for impressing a potential difference across the electrodes of a value so chosen relative to the length of the electrodes and the rate of feed of the strip as to be sufficient to cause, during the length of time any particular portion of the strip is between the electrodes, breakdown of the material at a point where the dielectric strength drops below a predetermined degree but not sufficient to otherwise cause breakdown of the material in that length of time.

5. Apparatus for testing dielectric material having, in combination, two electrodes, means for feeding a strip of material between the electrodes, a transformer having its secondary in circuit with the electrodes, and means including a centrifugal switch having a driving member adapted to be driven by said feeding means whereby when the speed of the feeding means reeaches a predetermined speed the circuit connection with the primary of the transformer is closed.

6. Apparatus for testing dielectric material having, in combination, electrodes, means for feeding the material to be tested between the electrodes, a transformer having its secondary in circuit with the electrodes, and means adapted to be controlled by the speed of operation of said feeding means whereby when the speed of travel of said material reaches a predetermined degree the primary of said transformer is energized.

7. Apparatus for testing dielectric material having, in combination, electrodes, means for feeding the material to be tested between the electrodes, a transformer having its secondary in circuit with the electrodes, a rotating device, and means acting automatically to energize the primary of the transformer when said device reaches a predetermined speed.

8. Apparatus for testing dielectric material having in combination, two electrodes, means for feeding a strip of material between the electrodes, a circuit adapted when closed to impress a potential difference across said electrodes, and means responsive to the speed of operation of said feeding means for closing said circuit when the speed of said feeding means reaches a predetermined value.

9. Apparatus according to claim 8 including means responsive to an increase in the current in said circuit due to breakdown of the strip of material under the potential difference impressed across the electrodes for opening and for maintaining open said circuit.

In testimony whereof, I have signed my name to this specification.

DOUGLAS M. McBEAN.